though not required, from the amount and kind of preformed cosurfactant material that in- creases the salinity of that solution so that, in contact with the oil in the reservoir, it will form a surfactant system having a salinity requirement which minimizes the interfacial tension between it and the oil.

United States Patent [19]

Thigpen et al.

[11] Patent Number: 5,068,043

[45] Date of Patent: Nov. 26, 1991

[54] PREFORMED SURFACTANT-OPTIMIZED AQUEOUS ALKALINE FLOOD

[75] Inventors: David R. Thigpen; Jimmie B. Lawson; Richard C. Nelson, all of Houston, Tex.

[73] Assignee: Shell Oil Company, Houston, Tex.

[21] Appl. No.: 391,004

[22] Filed: Aug. 9, 1989

Related U.S. Application Data

[63] Continuation-in-part of Ser. No. 797,340, Nov. 12, 1985, abandoned, which is a continuation-in-part of Ser. No. 585,468, Mar. 2, 1984, abandoned, which is a continuation-in-part of Ser. No. 411,779, Aug. 26, 1982, abandoned.

[51] Int. Cl.$^5$ .............................................. E21B 43/22
[52] U.S. Cl. .............................. 252/855.4; 252/8.551; 166/270; 166/271; 166/272; 166/273; 166/274; 166/275
[58] Field of Search ..................... 252/8.551, 8.554; 166/270, 273, 274, 275

[56] References Cited

U.S. PATENT DOCUMENTS

| | | | |
|---|---|---|---|
| 3,330,344 | 7/1967 | Reisberg | 166/9 |
| 3,469,630 | 9/1969 | Hurd et al. | 166/250 |
| 3,493,051 | 2/1970 | Gogarty | 166/274 |
| 3,532,166 | 10/1970 | Williams | 166/274 |
| 3,700,031 | 10/1972 | Germer et al. | 166/270 |
| 3,777,817 | 12/1973 | Feuerbacher et al. | 166/274 |
| 3,804,170 | 4/1974 | Krehibiel et al. | 166/270 |
| 3,804,171 | 4/1974 | Krehbiel et al. | 166/270 |
| 3,827,497 | 8/1974 | Dycus et al. | 166/274 |
| 3,847,823 | 11/1974 | Clark et al. | 252/8.55 D |
| 3,865,187 | 2/1975 | Carlin et al. | 166/273 |
| 3,865,735 | 2/1975 | Clark et al. | 252/8.554 |
| 3,912,010 | 10/1975 | Clark et al. | 166/270 |
| 3,927,716 | 12/1975 | Burdyn et al. | 166/270 |
| 3,945,437 | 3/1976 | Chiu et al. | 166/305 R |
| 3,952,803 | 4/1976 | Kerfoot et al. | 166/270 |
| 3,977,470 | 8/1976 | Chang | 166/273 |
| 4,004,638 | 1/1977 | Burdyn et al. | 166/273 |
| 4,157,115 | 6/1979 | Kalfoglou | 166/274 |
| 4,212,748 | 7/1980 | Ferrell et al. | 252/8.554 |
| 4,213,500 | 7/1980 | Cardenas et al. | 166/273 |
| 4,293,428 | 10/1981 | Gale et al. | 252/8.55 D |
| 4,330,418 | 5/1982 | Glinsmann et al. | 252/8.55 D |
| 4,446,036 | 5/1984 | Hsieh et al. | 252/8.554 |
| 4,458,755 | 7/1984 | Southwick et al. | 166/250 |
| 4,466,892 | 8/1984 | Chan et al. | 252/8.55 D |
| 4,493,371 | 1/1985 | Reisberg et al. | 166/274 |
| 4,502,541 | 3/1985 | Lawson et al. | 166/275 |

OTHER PUBLICATIONS

"Phase Relationships in Chemical Flooding", by R. C. Nelson and G. A. Pope, Soc. of Pet. Engineers Journal, Oct. 1978, pp. 325-338.
"The Salinity Requirement Diagram–A Useful Tool in Chemical Flooding Research and Development", by R. C. Nelson, SPE 8824, 1980.
"Divalent Ion Exchange with Akali", by A. L. Bunge, G. Klein and C. J. Radke, SPE 8995, 1980.
"Cosurfactant-Enhanced Alkaline Flooding", by R. C. Nelson, J. B. Lawson, D. R. Thigpen and G. L. Stegemeier, SPE/DOE 12672, 1984.
"Shell Says Cosurfactant/Alkaline Flooding Shows Promise", Enhanced Recovery Week, Apr. 30, 1984.
"Shell Begins White Castle Alkaline-Cosurfactant Flood", Enhanced Recovery Week, Jun. 16, 1986.
"Enhanced Recovery Pilot Begins in Louisiana", QUEST, May-June, 1986.

*Primary Examiner*—Robert L. Stoll
*Assistant Examiner*—Chhaya Sayala

[57] ABSTRACT

An aqueous alkaline flood for recovering oil from a reservoir containing acidic oil is improved by adding to the injected aqueous alkaline solution both a stoichiometric excess of the alkaline material and a kind and amount of preformed cosurfactant material that increases the salinity of that solution so that, in contact with the oil in the reservoir, it will form a surfactant system having a salinity requirement which minimizes the interfacial tension between it and the oil.

32 Claims, No Drawings

PREFORMED SURFACTANT-OPTIMIZED AQUEOUS ALKALINE FLOOD

RELATED APPLICATIONS

The present application is a continuation-in-part of application Ser. No. 797,340, filed Nov. 12, 1985, now abandoned, which was a continuation-in-part of application Ser. No. 585,468, filed Mar. 2, 1984, now abandoned, which was a continuation-in-part of Ser. No. 411,779, filed Aug. 26, 1982, now abandoned.

BACKGROUND OF THE INVENTION

The present invention relates to an aqueous alkaline flood process for recovering oil by injecting an aqueous alkaline solution into a subterranean oil reservoir containing an acidic oil. More particularly, the present invention relates to such a process in which a specified amount of a specified type of preformed cosurfactant material is added to the injected solution in order to solve a problem encountered by the prior alkaline flood processes.

Numerous aqueous alkaline flood processes have been proposed, and various processes involving injecting an aqueous alkaline solution and various preformed surfactants have been described in U.S. patents, such as the following: U.S. Pat. No. 3,777,817 describes injecting an aqueous alkaline solution to satisfy the surfactant adsorption sites on the reservoir rock and then injecting a surfactant-containing aqueous liquid which may also contain alkali. U.S. Pat. Nos. describe injecting aqueous alkaline solutions containing overbased petroleum sulfonate surfactants which are formed by over-neutralizing petroleum hydrocarbon sulfonates. U.S. Pat. Nos. 3,977,470 and 4,004,638 describe injecting an aqueous alkaline solution followed by an aqueous alkaline solution which contains a preformed surfactant which can be substantially any hydrocarbon sulfonate and can be accompanied by polyphosphates and carbonates that enhance the oil displacing efficiency of the process.

Although the prior processes in which preformed surfactants were included in injected aqueous liquid solutions were designed to improve the oil recovery efficiency of similar processes free of the preformed surfactants, a serious problem is present in either type of such prior processes. Whenever an aqueous alkaline solution is injected into an oil reservoir, some or all of the alkali may be consumed by chemical reactions other than the desired reaction of converting petroleum acids to surfactant soaps. For example, multivalent cations dissolved in the water in the reservoir and/or associated with clay or other reservoir rock materials can rapidly consume alkali by forming and precipitating multivalent metal hydroxides or salts. In siliceous reservoirs significant proportions of alkali are consumed by dissolving silicon oxide and by forming alkali metal silicates, etc. Because of such side reactions, if the injected aqueous alkaline solution is dilute, the alkali will propagate slowly through the reservoir rocks. The frontal propagation rate is slow because, as each portion of the injected solution contacts fresh portions of rock, some or all of its alkali content may be consumed by the side reactions. This is repeated over and over, and thus, although the unreactive liquid components of the injected solution may move through the reservoir at the rate corresponding to the rate at which the solution was injected, the movement through the reservoir of the alkali may be much slower. For example, it is disclosed in SPE Paper No. 8995 by Bunge et al that, when an aqueous alkaline solution containing 0.44% sodium hydroxide and 1.0% sodium chloride was flowed through a core of Wilmington sand which initially contained 1.0% calcium chloride solution, more than two pore volumes of the aqueous alkaline solution had to be injected before any of the sodium hydroxide reached the outflow end of the core.

But it is known that, for example, as indicated in U.S. Pat. No. 3,927,716, when an aqueous alkaline solution reacts with an acidic oil, the lowest interfacial tension between the aqueous solution and the oil frequently occurs when the concentrations of the alkali and neutral salt in the aqueous alkaline solution are low and are within a rather narrow range, such as about 0.01 to 0.04% by weight of alkali and 0.5 to 2.0% neutral salt. Thus, a problem remained. The teachings of the prior art do not disclose how to obtain the low interfacial tension required for a good oil recovery while injecting an aqueous alkaline solution containing the high alkali concentration required for a satisfactory rate of alkali propagation within the reservoir.

SUMMARY OF THE INVENTION

The present invention relates to an improved process for recovering oil from an acidic oil reservoir by injecting into the reservoir an aqueous solution which contains alkaline material for neutralizing acidic components of the reservoir oil and at least one substantially neutral compound for increasing the oil-displacing efficiency of the injected solution and/or the petroleum acid soap-containing surfactant system which is formed within the reservoir. In the present process the aqueous alkaline solution to be injected is compounded by mixing an aqueous liquid and at least one substantially neutral compound with both an excess of alkaline material (relative to the amount required for neutralizing the acidic components of the reservoir oil) and the following kind and amount of at least one preformed cosurfactant. Said cosurfactant comprises at least one compound which is amphiphilic to the extent of being significantly soluble in both the aqueous alkaline solution and the reservoir oil while being more soluble in the aqueous alkaline solution, relative to a solubility in the reservoir oil, than are the soaps of the acidic components of the reservoir oil. The composition and concentration of said cosurfactant are correlated, with respect to (a) the electrolyte content of the solution to be injected, (b) the kind and amount of acidic components in the reservoir oil, and (c) the kind and amount of electrolytes which will be dissolved by the injected solution as it is flowed through the pores of the reservoir and reacts with the reservoir oil to form a surfactant system. The composition of said cosurfactant is selected and the concentration of the selected cosurfactant is adjusted so that the solution to be injected has an alkalinity, salinity, and preformed cosurfactant content capable of causing the salinity of the surfactant system which will be formed within the reservoir to substantially equal the salinity requirement for minimizing the interfacial tension between that reservoir oil and that surfactant system at that reservoir temperature.

DESCRIPTION OF THE INVENTION

Applicants have discovered a remedy for the alkaline flooding problem of how to provide a low concentration of alkali in order to form an effectively low interfacial tension between the aqueous solution and the reservoir oil while at the same time providing a relatively high alkali concentration in order to obtain a satisfactory rate of propagation of alkali through the reservoir. They discovered that this can be accomplished by injecting an aqueous alkaline solution in which the deleterious effects of a high electrolyte concentration are mitigated by the addition of a relatively small amount of a preformed cosurfactant material. And they discovered that the kind and amount of such a material which is required for a given reservoir can be determined by tests which are feasibly inexpensive and accurate.

As known, when an aqueous alkaline solution contacts a crude oil which contains a significant amount of petroleum acids, surfactants are formed in-situ. Such surfactants are, essentially, soaps of the petroleum acid components of the oil and are capable of producing a low interfacial tension between the oil and an aqueous solution. How low that interfacial tension will be is affected by factors inclusive of: the temperature of the reservoir, the kind and amount of petroleum acid components contained within the reservoir oil, the kind and concentration of alkali in the alkaline solution, the kind and amount of electrolytes dissolved in the injected alkaline solution, the kind and amount of electrolytes dissolved in the water in the reservoir, the properties of the reservoir oil, and the like.

Applicants have made important discoveries, such as the following, with respect to a process for injecting an aqueous alkaline solution into a reservoir (which contains an acidic oil) in order to form a surfactant system within the reservoir. First, a significant increase can be provided in the "salinity requirement" of the surfactant system formed within the reservoir. The "salinity requirement" refers to the concentration of dissolved electrolyte, inclusive of the excess alkali and the electrolyte which becomes dissolved while the aqueous solution is in the reservoir, which minimizes the interfacial tension between the reservoir oil and the surfactant system with which the oil is being contacted. Applicants found that such an increase in salinity requirement can be provided by dissolving in the aqueous alkaline solution to be injected a preformed cosurfactant material which is more soluble in that solution, relative to the reservoir oil, than are the petroleum soaps formed from the reservoir oil. (In other words, a preformed cosurfactant material regarding which the solubility ratio based on solubility in the aqueous alkaline solution to solubility in the oil is greater for the preforme cosurfactant material than it is for the petroleum acid soaps.) Second, for a typical reservoir oil, such an increase in the salinity requirement can make the salinity requirement equivalent to a concentration of alkali high enough to provide a satisfactory propagation rate of alkali through the reservoir; even though such a propagation rate is apt to require a concentration of alkaline material equal to (or equivalent to) an alkali metal hydroxide concentration of about 0.8% of the weight of the aqueous alkaline solution. Third, such an increase of the salinity requirement can be obtained without an undue increase in the cost of a waterflood oil recovery process, since the amount of preformed cosurfactant material required is small relative to the amount of preformed surfactant required for a chemical flood.

EXAMPLES

The following examples illustrate the effects of including the presently specified type of preformed cosurfactant in an aqueous alkaline flood. Laboratory simulations of oil recovery processes were conducted in 12-inch Berea cores at flow rates corresponding to one foot per day. Details of the procedures and materials used are listed in Table 1.

TABLE 1

EFFECT OF IMPROVING MOBILITY CONTROL AND ADJUSTING SALINITY REQUIREMENT ON THE PERFORMANCE OF A CAUSTIC FLOOD*

| Experiment Numbers: | 1250 | 1251 | 1254 | 1255 |
|---|---|---|---|---|
| Core Data: | | | | |
| Dimensions, inches | 2 × 2 × 11 | 2 × 2 × 11 | 2 × 2 × 11 | 2 × 2 × 11 |
| Porosity, fraction $V_p$ | 0.202 | 0.191 | 0.181 | 0.181 |
| Permeability, md | 268 | 165 | 129 | 172 |
| Permeability @ $S_{or}$, md | 8.4 | 5.6 | 3.8 | 5.9 |
| $S_{or}$, fraction $V_p$ | 0.430 | 0.432 | 0.416 | 0.418 |
| Waterflood: | | | | |
| NaCl, wt % | 1.00 | 1.00 | 1.20 | 1.20 |
| Caustic Solution: | | | | |
| NaOH, wt % | 0.80 | 0.80 | 0.80 | 0.80 |
| NaCl, wt % | 1.00 | 1.00 | 1.20 | 1.20 |
| Xanflood QC-128, wt % | — | 0.200 | — | 0.200 |
| NEODOL ® 25-3S, wt % | — | — | 0.30 | 0.30 |
| Frontal Advance Rate, ft/day | 0.94 | 1.01 | 0.98 | 1.02 |
| Performance Data: | | | | |
| Oil breakthrough, $V_p$ | 0.48 | 0.25 | 0.37 | 0.24 |
| Chemical breakthrough, $V_p$ | 0.51 | 0.52 | 0.50 | 0.61 |
| $S_{orc}$ @ 1 $V_p$, fraction $V_p$ | 0.33 | 0.22 | 0.28 | 0.17 |
| $S_{orc}$, Final, fraction $V_p$ | 0.30 | 0.14 | 0.16 | 0.06 |
| Clean oil, fraction $S_{or}$ | 0.06 | 0.31 | 0.11 | 0.40 |
| Recovery @ 1 $V_p$, fraction $S_{or}$ | 0.22 | 0.49 | 0.33 | 0.59 |
| Recovery, final fraction $S_{or}$ | 0.31 | 0.68 | 0.61 | 0.86 |

*Mokoko South Crude in Berea Sandstone at 126° F. Continuous Flood, where:
$V_p$ = pore volume
$S_{or}$ = residual oil saturation after waterflood
$S_{orc}$ = residual oil saturation after aqueous alkaline solution flood In the first test listed in the Table 1, test No. 1250, Mokoko South crude (acid number 2.76) is displaced by 0.8% by weight sodium hydroxide solution containing 1% by weight sodium chloride. As with most acidic crude oils, the optimum interfacial tension activity for the Mokoko South crude occurs at about 0.2% sodium hydroxide (in the absence of any preformed surfactant or substantially neutral salts). However, as discussed above, a higher concentration of the alkali is required for a satisfactory propagation of the alkali band (or concentration wave) through the reservoir. In view of this, a concentration of 0.8% sodium hydroxide was used in the comparative tests.

Tests 1250 and 1254 are substantially the same, except for the presence of 0.30% by weight of the preformed surfactant NEODOL ® 25-3S and 1.20% sodium chloride (rather than 1.00%) in test 1254. As indicated by the tabulated data, the addition of that amount of that preformed surfactant increased the salinity requirement for the surfactant system formed within the core to a value equaling that of the electrolyte concentration resulting from the interaction between the injected caustic solution and the formation brine in the core (1.00% sodium chloride in water). As shown on the bottom line of Table 1, the amount of oil recovered by the alkaline flood increased from 0.31 to 0.61 times the water-flood residual oil saturation when preformed surfactant was included in the formulation.

Tests 1251 and 1255 amount to substantial reruns of the tests 1250 and 1254 using a conventional water-thickening polymer in order to investigate the effect of mobility control in aqueous alkaline floods with and without a preformed surfactant of the presently specified type and concentration. The tests show that the benefits of both the mobility control and the preformed surfactant are substantial. In test 1251 the percent of water flood residual oil recovered by the flood was 68% without the preformed surfactant, and in test 1255 it was 86% with the preformed surfactant.

Unobviously, when an aqueous alkaline flood contains a preformed cosurfactant in accordance with the present invention, it can provide an oil recovery of 86% or more of the water flood residual oil. This amounts to an oil recovery efficiency equaling that of a conventional chemical flood in which the primary surfactant is a preformed surfactant. However, in the present process the concentration of preformed cosurfactant material is significantly less than the amount of preformed surfactant required for a chemical flood. For example, in the 1255 test the concentration of preformed surfactant concentration was only 0.3%, which is much less than the concentration of preformed surfactant used in a conventional chemical flood.

Additional core flood tests were conducted with a Northern Gulf Coast reservoir oil having an API gravity of 27 and an acid number of 1.0. All of the floods were continuous, at 164° F., in 2"×2"×10" Berea cores of about 600 millidarcy permeability and 21% porosity. The injected aqueous alkaline solutions each contained 1.55% by weight of sodium metasilicate, a preformed cosurfactant, and an amount of sodium chloride sufficient to provide a substantially optimum salinity for lowering the interfacial tension between the surfactant system formed by the reaction between the injected aqueous solution and the oil within the core. The flood rate was one foot per day, and no flood water thickening material was used. The results of the tests are listed in Table 2.

TABLE 2

COMPARISON OF VARIOUS COSURFACTANTS IN COSURFACTANT-ENHANCED ALKALINE FLOODING

| Test Number | Cosurfactant | Chemical Type | Percent of Waterflood Residual Oil Recovered After One and Two Pore Volumes of Flooding | |
|---|---|---|---|---|
| | | | 1 PV | 2 PV |
| 1 | Shell $C_{20-24}$ IOS | Internal Olefin Sulfonate | 65 | 90 |
| 2 | Lion $C_{17-20}$ IOS | Internal Olefin Sulfonate | 53 | 72 |
| 3 | NEODOL ® 25-3S | Alcohol Ethoxysulfate | 38 | 51 |
| 4 | Tall Oil Pitch | Natural Product | 34 | 53 |
| 5 | NEODOL ® 25-12 | Alcohol Ethoxylate | 33 | 35 |
| 6 | Bio-Soft D-62 | Sodium Dodecylbenzene Sulfonate | 32 | 48 |
| 7 | Shell 380 Sulfonate | Petroleum Sulfonate | 28 | 41 |
| 8 | Alipal CO-436 | Alkylphenol Ethoxysulfate | 28 | — |
| 9 | Tall Oil Rosin | Natural Product | 27 | 39 |
| 10 | Witco TRS-30 | Petroleum Sulfonate | 25 | 38 |
| 11 | Petrostep 350 | Petroleum Sulfonate | 23 | 39 |
| 12 | Igepal DM-970 | Alkylphenol Ethoxylate | 20 | 29 |
| 13 | Exxon LD 654-11 | Ethoxylated Hexyl Alcohol | 18 | 33 |
| 14 | Exxon LD 654-15 | Ethoxylated Decyl Alcohol | 16 | 23 |
| 15 | Shell $C_{12}$ AOS | Alpha Olefin Sulfonate | 16 | 29 |
| 16 | Avitone F | Sodium Hydrocarbon Sulfonate | 15 | 34 |
| 17 | None | — | 17 | 24 |

Where more than one flood was performed with a particular cosurfactant the best results are reported. Since more floods were conducted with internal olefin sulfonates than with the other cosurfactants, the listed results may be somewhat biased in favor of the efficiency of the internal olefin sulfonate. However, considering the good hydrolytic and thermal stability of internal olefin sulfonates the potentially reasonable cost and their unobviously good performance in laboratory tests, the compositions containing them are believed to be particularly unobvious and valuable.

As indicated by Tests No. 1 and 2 of Table 2, the preformed cosurfactants comprising internal olefin sulfonates are particularly effective for use in the present process. The $C_{20-24}$ internal olefin sulfonates used in Test No. 1 recovered almost twice as much of the water-flood residual oil after 1 pore volume of flooding as that recovered by the NEODOL ® 25-3S alcohol ethoxysulfate cosurfactant used in Test No. 3. Since NEODOL ® 25-3S has heretofore been substantially the most effective cosurfactant available for use in chemical floods or aqueous alkaline water floods (at temperatures of not more than about 150° F.), it now appears that an aqueous alkaline water flood containing at least one internal olefin sulfonate (preferably one containing from about 17 to 25 carbon atoms) tailored, in respect to its individual composition and proportion, relative to the other components of the alkaline solution and to the reservoir temperature and properties of the oil and minerals in the reservoir, provides an unobviously effective alkaline water flooding process. In such a process, where the well or reservoir to be treated contains silicious material apt to be dissolved by an aqueous solution of an alkali metal hydroxide, such an internal olefin cosurfactant is preferably used in an aqueous alkaline solution containing at least a significant proportion of a water soluble silicate.

The extent of improvement in the recovery capability which is provided by the aqueous alkaline flooding process of the present invention is particularly significant in the following respect. Although an aqueous alkaline flood recovering say, one-quarter of the water flood residual oil may be currently economically feasible, the effect of such a flood on the possibility of future oil recovery from that reservoir should be considered. Once the petroleum acids in a crude oil have been converted to soaps by such a flood, there is no further opportunity for additional recovery by any aqueous alkaline flood in that reservoir. The remaining oil saturation, of only three quarters of the waterflood residual, significantly reduces the chance that any more effective method of enhanced oil recovery would ever be attempted. Thus, in such a reservoir, the three quarters of the waterflood residual oil is apt to be lost forever, unless the first-applied aqueous alkaline flood is a highly efficient process, such as the present process.

SUITABLE COMPOSITIONS AND PROCEDURES

The kind and amount of the preformed cosurfactant material used in the present process must be capable of increasing the salinity requirement of the surfactant system to be formed within the reservoir, in contact with the reservoir oil and at the reservoir temperature. A convenient way to test the ability of a given material to do this is by the use of laboratory cores or sand packs and/or salinity requirement diagrams and emulsion testing procedures of the type described in SPE Paper No. 8824 by R. C. Nelson. In constructing a salinity requirement diagram the objective is to plot the midpoint salinity and the range of salinity over which the system is in a type III phase environment as a function of surfactant concentration. Tests are made using at least three surfactant concentrations ranging from that of a full strength surfactant system to about 10 or 15% of such a concentration. Typically, this may involve equilibrating 10 to 25 milliliter samples of systems which, in volume percents, are: 80% brine; 5, 2.0, and 0.8% of surfactant and 15.0, 18.0, and 19.2% of oil. For each concentration of surfactant, the brines used should cover a wide enough range of salinity to equilibrate in the $II(-)$, III, and $III(+)$ phase environments. Sample tubes, each with a brine of different salinity are brought to temperature, shaken well, rocked periodically for a few days then allowed to stand until phase equilibrium is attained. The midpoint salinity is the level of salinity required to produce a microemulsion middle phase in which the volume fraction of oil substantially equals the volume fraction of brine. The test procedure assumes that essentially all of the surfactant is in the same phase; either a lower phase, upper phase or middle phase microemulsion. The three types of phase environment, $II(-)$, $II(+)$, and III are defined and further discussed in the paper by R. C. Nelson and G. A. Pope, "Phase Relationships in Chemical Flooding," SPE Journal, 1978, Pages 325–338. In terms of the salinity requirement diagram, a suitable preformed surfactant for use in the present process raises the alkali salinity requirement of the surfactant system formed by the interaction of aqueous alkali and reservoir oil by amounts which increase with increases in the concentration of preformed surfactant.

In general, a preformed cosurfactant suited for use in the present invention is soluble in the aqueous alkaline solution ("alkali/brine" solution) being injected into the reservoir, is an amphiphilic compound which is relatively soluble in the reservoir oil and has a solubility in the alkali/brine solution relative to its solubility in the oil which is greater than the solubility of the petroleum soaps (generated by that alkaline solution and that oil) in the alkali/brine solution relative to their solubility in the oil. Suitable preformed cosurfactants comprise amphiphilic molecules in which the polar groups are sulfates, sulfonates, nitrates, carboxylates, phosphates, phosphonates, betaines, imidazolines, alcohols, amides or the alkoxylated derivatives of amphiphilic molecules containing such polar groups. The non-polar parts of such amphiphilic molecules can be, but are not restricted to, aliphatic, aromatic or aliphatic-substituted aromatic hydrocarbon groups. Due to the low concentration of multivalent cations in aqueous alkaline solutions, amphiphilic molecules having more widely differing chemical structures may be useful as preformed surfactants in the present aqueous alkali solution than in conventional surfactant solutions, which have a substantially neutral pH. Particularly suitable preformed cosurfactants are typified by polyalkoxyalcohol sulfate surfactants such as NEODOL ® 25-3S (a polyethoxy aliphatic alcohol sulfate surfactant from Shell Chemical Company). Other preferred preformed cosurfactant compositions include aromatic ether polysulfonates, such as the Dowfax aromatic ether polysulfonate surfactants described in U.S. Pat. No. 3,945,437 by Y. C. Chiu and H. J. Hill, amyl or isopropyl alcohol, Igepon TC-42 or T-43 (sodium N-methyl-N-alkyl acid tartrate, from G.A.F.), Triton X-200 (sodium alkyl arlyl polyether sulfonate, from Rohm and Haas), Ethomed HT 15 (ethylene oxide condensates of fatty acid amides, from Armak), Aerosol OT (dialkyl ester of sodium sulfosuccinic acid, from Americal Cyanamid), Gafac LO-529 (sodium salt of organic phosphate ester, from G.A.F.), Stepanflo (alpha-olefin sulfonate surfactant, from Stepan Chemical Co.), petroleum acid soaps such as the sodium salt of Sunaptic Acid B (from Sum Chemical Co.), propoxylated ethoxylated nonionic surfactants such as those described in U.S. Pat. No. 4,293,428, amphiphilic coupling agents of the type described in U.S. Pat. No. 3,330,344 by J. Reisberg, etc.

Especially suitable preformed cosurfactants are typified by internal olefin sulfonate surfactants. Such surfactants can readily be obtained by sulfonating olefinic hydrocarbons having a high content of internal olefins in the C-10 to C-24 range, such as the internal olefins manufactured by the chlorination-dehydrochlorination of paraffins, or by paraffin dehydrogenation, and can also be prepared by isomerization or disproportionation of alpha-olefins. Internal-olefin-rich hydrocarbon products are manufactured and sold, for example, by Shell Chemical Company and by Liquichemica Company.

The alkali to be used in the present process is preferably an alkali metal hydroxide, of which sodium hydroxide is particularly suitable, and/or one or more additional water-soluble basic salts which are capable of providing a pH of at least about 10 when dissolved in water, such as the alkali metal carbonates and/or bicarbonates, the alkali metal silicates, etc.

Some basic alkali metal salts, such as the carbonates, may both buffer the pH of the injected aqueous alkaline system and tend to serve as a sacrificial agent for satisfying adsorption sites on the reservoir rocks and thus increasing the availability of the alkali for reaction with organic acids and/or affecting the amount of adsorption of the preformed surfactant, either of which effects tend to improve the oil displacement efficiency of a surfactant system. In general, substantially any such pH-buffering and/or adsorption-decreasing materials which are compatible with the other components of the presently described preformed surfactant-containing alkaline solutions can be utilized in the present process. For use in numerous reservoirs, the pH of those solutions should be from about 10 to 14 and preferably from about 10.5 to 13.5.

A commonly assigned U.S. Pat. No. 4,458,755 relates to a process for injecting an aqueous alkaline solution for displacing oil within a subterranean reservoir. It discloses that damage due to dissolving silica in or around the borehole of a well can be avoided by including in the injected aqueous alkaline solution an amount of soluble silica that is tailored to suit the well and reservoir conditions of temperature and silica content. The disclosures of that patent are included herein by reference.

Water-thickening agents suitable for use in the present invention comprise substantially any water-soluble or water-dispersable polymeric materials which (a) are capable of increasing the viscosity of the aqueous solution (while the solution is in the reservoir) to a value which exceeds that of the oil in the reservoir, and (b) are substantially unreactive with the other components of the injected aqueous alkaline solution and the surfactant system it forms within the reservoir. Examples of suitable water thickeners include Xanthan gum polymers such as Xanflood QC-128 (a particularly preferred thickener, from the Kelco Chemical Co.), the Polytran water thickeners (from the Pillsbury Company), the acrylamide polymeric materials such as Pusher chemicals (from Dow Chemical Company), etc.

A commonly assigned U.S. Pat. No. 4,493,371 describes a process for recovering oil from a subterranean reservoir in which the oil is acidic but forms alkali metal soap surfactant systems having only relatively low interfacial activity when that oil is reacted with an aqueous alkaline solution. In that process the oil is displaced by injecting a mixture of gas and an aqueous liquid solution containing a cosurfactant. The disclosures of that patent are incorporated herein by reference.

Complex frontal advance patterns are known to be involved in any process in which surfactants responsible for generating and propagating an oil bank are formed in-situ. In the present process, in which the surfactants formed in-situ are supplemented by preformed surfactants, the frontal advance patterns are further complicated. For example, assume that in a particular alkali flood the salinity of the alkaline solutions differs from the salinity of the preflood brine (or from the formation brine if no preflood is used). If a very brine-soluble cosurfactant, such as NEODOL ® 25-3S, is added to the alkaline solution, the salinity front, the preformed surfactant front and the in-situ-formed surfactant front are all likely to travel at different rates.

The advancing rate of the front of the petroleum acid soap surfactants formed in-situ may be the slowest. Alkali is consumed not only by converting petroleum acids to surfactants but also, usually to an even larger extent, by reactions with the rock. Thus, the leading edge of the wave of highest alkali concentration is being depleted continually. However, at least in core floods, with some systems being tested, the wave of highest alkali concentration leads the wave of highest preformed surfactant concentration.

In general, the propagation of preformed surfactant is not affected by the depletion of alkali; but in most systems, the preformed surfactant front cannot keep up with the salinity front, due to adsorption of the preformed surfactant on the rocks. If preformed surfactant is exposed to clean rock before that rock is contacted by the surfactant formed in-situ, relatively expensive preformed surfactant, instead of the less expensive in-situ-formed surfactant, may be wasted in satisfying the adsorption requirements of the rock. However, as indicated by the experimental results listed in Table 1, applicants have found that the amount of the specified type of preformed cosurfactant required to sufficiently increase the salinity requirement of the surfactant system formed within the reservoir, relative to the amount of the cosurfactant which is adsorbed on the rocks, is small enough to cause the operating cost of the present process to be significantly less than that of a conventional chemical flood, in which the primary surfactant is a preformed surfactant.

One procedure for reducing the adsorption of the preformed cosurfactant material is to use a preformed cosurfactant which changes its preferential solubility from brine to oil as the pH of an aqueous alkaline solution containing that cosurfactant is decreased. The frontal advance rate of such a preformed cosurfactant would tend to be closer to that of the in-situ-formed surfactant. When some of such a cosurfactant moves ahead of the front of high alkali concentration, the resultant decrease in the pH of the aqueous-phase containing it would partition more of the cosurfactant into the slower moving oil-phase. This would tend to retard the advance of the cosurfactant. When the pH of the aqueous-phase is increased by the arrival of the alkali front the cosurfactant would be partitioned back into the aqueous-phase. Tall oil fatty acid soaps, such as those formd from tall oil pitch, and petroleum acid soaps, such as the sodium soap of Sunaptic Acid B (From Sun Chemical Co.), are particularly suitable preformed surfactants in this regard.

More optimistically, the operator of the process may take advantage of the slower frontal advance rate of the alkali front in the employment of sacrificial adsorption agents. An inexpensive, water-soluble material capable of satisfying at least part of the adsorption requirements of the rock could be injected simultaneously with the alkali and still see clean rock first. Such sacrificial adsorption agents include alkali metal carbonates, sodium tripolyphosphate, tetrasodium pyrophosphate, sodium borate and the like sacrificial inorganic additives described in U.S. Pat. No. 3,469,630 and may allow caustic flooding of some reservoirs thought previously to be too low in acid number.

In some situations a programmed addition of the preformed surfactant can be utilized to reduce the extent of its adsorption on the rocks. Portions of aqueous alkaline solution containing less than the total proportion needed of preformed cosurfactant can be injected ahead of portions containing more than the total proportion needed so that at least some of the preformed cosurfactant is held back until most of the rocks through which it will flow have been precontacted by the salinity wave if not by both that wave and the alkali wave.

However, in various reservoir situations in which the acid number of the reservoir oil is relatively low, it may be advantageous to utilize a process of the type described in the commonly assigned U.S. Pat. No. 4,502,541. In the process of that application the injected aqueous alkaline solution contains at least one each of dissolved alkaline material, substantially neutral salt, and preformed cosurfactant material. However, the proportion of cosurfactant is significantly larger in the first injected portion than in later injected portions of the solution. The disclosures of that patent are included herein by reference.

What is claimed is:

1. In a process for recovering oil from an acidic oil reservoir by injecting an aqueous alkaline solution comprising water, sodium chloride, and alkaline material for reacting with the reservoir oil forming a petroleum acid soap to form an in-situ surfactant system, the improvement comprising:

1) selecting a preformed cosurfactant which is soluble in both the aqueous solution and the reservoir oil and has a solubility ratio which is greater than the solubility ratio of the petroleum acid soap where the solubility ratio is the ratio of solubility in the aqueous alkaline solution to the solubility in the reservoir oil;

2) combining with the alkaline solution an amount of the preformed cosurfactant which will result in the in-situ surfacant system havng a salinity about equal to a salinity which results in minimal interfacial tension between the oil in the reservoir and the in-situ surfactant system at reservoir temperature, wherein the amount of the preformed cosurfactant is about 0.3 percent by weight in the aqueous alkaline solution; and 3) injecting the cosurfactant-aqueous alkaline solution mixture into the reservoir to displace oil toward a fluid production location.

2. The process of claim 1 wherein the amount of the preformed cosurfactant is about 0.3 weight percent based on the aqueous alkaline solution.

3. The process of claim 2 wherein the alkaline material is present in the aqueous alkaline solution in a concentration of the equivalent of about 0.8 percent by weight sodium hydroxide.

4. The process of claim 3 wherein the sodium chloride is present in concentration of about 1.2 percent by weight of the aqueous alkaline solution 5. The process of claim 1 in which the aqueous alkaline solution further comprises a polymeric water-thickening agent.

6. The process of claim 1, in which the preformed cosurfactant is a polyalkoxyalcohol sulfate surfactant.

7. The process of claim 1 in which the aqueous alkaline solution further comprises a xanthan gum water-thickening agent.

8. The process of claim 1 in which the preformed cosurfactant is a polyoxyalcohol sulfate surfactant and the alkaline material includes sodium carbonate.

9. The process of claim 8 in which the aqueous alkaline solution further comprises a xanthan gum water-thickening polymer.

10. The process of claim 1 in which the preformed cosurfactant is an internal olefin sulfonate.

11. The process of claim 10 in which the internal olefin sulfonate cosurfactant contains from about 17 to 25 carbon atoms.

12. A process for recovering oil from an acidic oil reservoir by injecting an aqueous solution of alkaline material, which solution is capable of reacting with the oil to form petroleum acid soaps, the improvement comprising:

formulating the aqueous solution to be injected to be substantially free of multivalent cations and to contain (a) an amount of alkaline material equivalent to about 0.8 wt percent or more alkali metal hydroxide, and a preformed cosurfactant, which cosurfactant is an amphiphlic compound, is soluble in both the injected aqueous solution and the reservoir oil while being more soluble in the aqueous solution than are the petroleum soaps which are formed from the oil (1) and has a greater solubility ratio than the solubility ratio of the petroleum acid soaps where the solubility ratio is the ratio of solubility in the aqueous alkaline solution to the solubility in the reservoir oil, and (2) is contained within the injected solution in a concentration of about 0.3 wt percent; and injecting said solution into the reservoir to displace oil toward a fluid production location.

13. The process of claim 12 in which the aqueous solution of alkaline material includes a polymeric water-thickening agent.

14. The process of claim 12 in which the preformed cosurfactant is a polyalkoxyalcohol sulfate surfactant.

15. The process of claim 12 in which the aqueous solution of alkaline material includes a xanthan gum or polyacrylamide water-thickening agent.

16. The process of claim 12 in which the preformed cosurfactant is a polyoxyalcohol sulfate surfactant and the alkaline material includes sodium carbonate.

17. The process of claim 16 in which the aqueous solution of alkaline material includes a xanthan gum or a polyacrylamide water-thickening polymer.

18. The process of claim 12 in which the preformed cosurfactant is an internal olefin sulfonate.

19. The process of claim 18 in which the internal olefin sulfonate cosurfactant contains from about 17 to 25 carbon atoms.

20. An aqueous alkaline solution for displacing an acidic oil within a subterranean reservoir comprisng:

an aqueous alkaline solution which is substantially free of multivalent cations and contains solutes which comprise about 0.3 weight percent of an internal olefin sulfonate cosurfactant, which cosurfactant is (a) soluble in both said aqueous alkaline solution and reservoir oil, and (b) has a higher solubility ratio than reaction products of the aqueous alkaline solution and the acid components of the reservoir oil where the solubility ratio is the ratio of solubility in the aqueous alkaline solution to the solubility in the reservoir oil; and alkaline material in an amount equivalent to about 0.8 wt percent or more of alkali metal hydroxide and such that the solution is capable of reacting with the reservoir oil, within the reservoir, to form a surfactant system having a salinity which is about equal to the optimum for minimizing the interfacial tension between that surfactant system and the reservoir oil.

21. The composition of claim 20 in which said cosurfactant contains from about 17 to 25 carbon atoms per molecule.

22. The composition of claim 20 in which said alkaline material is selected from the group consisting of sodium silicate, sodium hydroxide, sodium carbonate, and ammonium hydroxide.

23. The composition of claim 20 in which said cosurfactant consists essentially of an internal olefin sulfonate containing about 20 to 24 carbon atoms per molecule.

24. The composition of claim 20 in which said cosurfactant consists essentially of internal olefin sulfonates containing about 17 to 20 carbon atoms per molecule.

25. The composition of claim 20 in which said cosurfactant consists essentially of a mixture of internal olefin sulfonates containing, respectively, 17 to 20 and 20 and 24 carbon atoms per molecule.

26. An aqueous alkaline solution for displacing an acidic oil within a subterranean reservoir, the solution comprising:

a) an amount of an alkaline material which exceeds that required to neutralize the acidity of the reservoir oil;

b) about 0.3 percent by weight of at least one internal olefin sulfonate cosurfactant, the cosurfactant being i) soluble in both the aqueous alkaline solution and the reservoir oil, and ii) has a higher solubility ratio than reaction product of the acidic components of the reservoir oil and the alkaline material where the solubility ratio is the ratio of solubility in the aqueous alkaline solution to the solubility in the reservoir oil; and c) sodium chloride, wherein the solution is capable of reacting with the reservoir oil within the reservoir to form a surfactant system having a salinity which is about the salinity which is optimum for minimizing the interfacial tension between the surfactant system and the reservoir oil.

27. The aqueous alkaline solution of claim 26 wherein the cosurfactant is present in the solution in a concentration of about 0.3 percent by weight.

28. The composition of claim 27 in which said cosurfactant contains from about 17 to 25 carbon atoms per molecule.

29. The composition of claim 27 in which said alkaline material is selected from the group consisting of sodium silicate, sodium hydroxide, sodium carbonate, and ammonium hydroxide.

30. The composition of claim 27 in which said cosurfactant consists essentially of an internal olefin sulfonate containing from about 20 to 24 carbon atoms per molecule.

31. The composition of claim 27 in which said cosurfactant consists essentially of internal olefin sulfonates containing from about 17 to 20 carbon atoms per molecule.

32. The composition of claim 27 in which said cosurfactant consists essentially of a mixture of internal olefin sulfonates containing, respectively, 17 to 20 and 20 to 24 carbon atoms per molecule.

* * * * *